United States Patent [19]
Volkonsky

[11] Patent Number: 5,917,740
[45] Date of Patent: *Jun. 29, 1999

[54] APPARATUS FOR REDUCING A COMPUTATIONAL RESULT TO THE RANGE BOUNDARIES OF A SIGNED 16-BIT INTEGER IN CASE OF OVERFLOW

[75] Inventor: Vladimir Y. Volkonsky, Moscow, Russian Federation

[73] Assignee: Sun Microsystems, Inc., Palo Alto, Calif.

[*] Notice: This patent is subject to a terminal disclaimer.

[21] Appl. No.: 08/881,510

[22] Filed: Jun. 24, 1997

Related U.S. Application Data

[62] Division of application No. 08/881,720, Jun. 23, 1997.

[51] Int. Cl.$^6$ .................................................. G06F 7/38

[52] U.S. Cl. .................................................. 364/745.03

[58] Field of Search ........................... 364/715.04, 736.5, 364/737, 738, 740, 745.01, 745.02, 745.03, 745.04, 748.03, 748.04

[56] References Cited

U.S. PATENT DOCUMENTS

| | | | |
|---|---|---|---|
| 4,945,507 | 7/1990 | Ishida et al. | 364/737 |
| 5,402,368 | 3/1995 | Yamada et al. | 364/745.03 |
| 5,508,951 | 4/1996 | Ishikawa | 364/745.03 |
| 5,539,685 | 7/1996 | Otaguro | 364/757 |

OTHER PUBLICATIONS

"The UltraSPARC Processor—Technology White Paper; The UltraSPARC Architecture," pp. 1–10, Copyright 1994–1997 Sun Microsystems, Inc., Palo Alto, CA.

*Primary Examiner*—Chuong Dinh Ngo
*Attorney, Agent, or Firm*—D'Alessandro & Ritchie

[57] ABSTRACT

The present invention is directed to checking and reducing an intermediate signal arising from a manipulation of 16-bit signed data signals without using conditional branches, thereby improving instruction processing in a superscalar pipelined processor or an arithmetic unit that can execute several arithmetic operations concurrently. In the preferred embodiment of the present invention, the data signals are represented as signed 16-bit binary values in a two's compliment format. An intermediate register is used to hold the intermediate signal which is greater than 16-bits in width to allow for the proper checking of an overflow condition. It is presently contemplated that the present invention include using a processor operating under program control. The program determines whether the intermediate signal is in a positive or negative overflow state. The program sets a first mask signal to have 16 lower bits in an ON position when the intermediate signal is within the range boundary of a 16-bit signed integer. If the intermediate signal exceeds the maximum range boundary of 32767, the first mask signal is set to have its 31st through 17th bits in the ON position. If the intermediate signal exceeds the minimum range boundary of –32767, the first mask signal is set to have its 32nd bit position set to the ON position The second mask signal has a value that is equal to the first mask value bit-shifted 16 bit positions to the right. Finally, the program bitwise ANDs the original intermediate signal with the first mask signal to obtain a translated data signal, and bitwise ORs the translated data signal with the second mask signal.

12 Claims, 4 Drawing Sheets

INT SRC, DST;

UNSIGNED MASK32[ ] = 0X0000FFF, 0X7FFF0000, 0X80000000, 0X0000FFFF

UNSIGNED MASK1, MASK2;

UNSIGNED CHAR *PMASK = (UNSIGNED CHAR*) MASK32;

MASK1 = *((UNSIGNED*) (PMASK + ((SRC>> 13) & 0XC)));

MASK2 = MASK 1 >> 16;

DST = (SRC & MASK1) I MASK2;

*FIG. 5*

APPARATUS FOR REDUCING A COMPUTATIONAL RESULT TO THE RANGE BOUNDARIES OF A SIGNED 16-BIT INTEGER IN CASE OF OVERFLOW

CROSS-REFERENCE TO RELATED APPLICATION

This application is a division of patent application Ser. No. 08/881,720 filed Jun. 23, 1997, and entitled, "METHOD AND APPARATUS FOR REDUCING A COMPUTATIONAL RESULT TO THE RANGE BOUNDARIES OF A SIGNED 16-BIT INTEGER IN CASE OF OVERFLOW", by inventor Vladimir Yu. Volkonsky, assignor to Sun Microsystems, Inc., a Delaware corporation.

BACKGROUND OF THE INVENTION

1. Field of the Invention

This invention relates to a method and apparatus for optimizing overflow checking and reduction of data signals represented as signed 16-bit integers.

2. Description of Related Art

The explosion of graphics, audio, and video ("multimedia") related applications in computer systems has fueled efforts in improving processor efficiency with regard to processing multimedia signals. Multimedia signals include audio and pixel ("picture elements") signals, among other things, and which may be sufficiently represented using binary data of no more than eight bits of resolution. Binary data having greater widths may also be used but are often limited to intermediate results for advanced data manipulation since such data formats lead to an increase load on instruction execution, resulting in slower rates of data manipulation by a processor.

A computer system running a video application may represent color pixels through four signed 16-bit signals, with each signed 16-bit signal representing the three primary color values of red, green, and blue and an intensity value. This translates to a large amount of data signals required to represent an image for display on a computer screen even when restricting pixel data widths to eight bits. For example, to display a digital NTSC video signal in real-time on a computer monitor requires a pixel rate of 10.4 million pixels per second. With three data signals to manipulate per pixel, this translates to about 30 million pieces of data to manipulate per second. A processor clock rate of 200 million MHz would only have 20 clock cycles available for processing each pixel which is less than seven clock cycles for each primary color value.

Manipulating pixel data that are represented using signed 16-bit integers usually requires that the resulting pixel data remain within the maximum negative and positive boundaries of a signed 16-bit integer. A signed 16-bit integer in two's compliment format has a maximum range boundary of 32767 and a minimum range boundary of −32767. For example, when scaling or rotating images, it is necessary to combine the incoming signal being processed with other internally generated signal data in order to obtain the resulting pixel data. This ensures that if an overflow state does occur, the resulting pixel data is reduced to a value supported by the data format in which the pixel is represented. If either of the range boundaries is exceeded by the resulting pixel data, the resulting pixel data is reduced to within the maximum or minimum range boundaries of 32767 and −32767, respectively.

In the past, checking resulting pixel data for an overflow condition included using conditional branches. For example, in one such method branch operations in the programming language "C" are used in the following manner.

```
int dst;

if (dst > 32767) dst = 32767;

if (dst < -32767) dst = -32767;
```

The resulting pixel data, which is represented as the variable "dst," is compared with the upper range boundary of 32767. If the resulting pixel data exceeds the upper range boundary, then the upper range boundary value is transferred into the resulting pixel data. Otherwise, a conditional branch occurs which bypasses the execution of the second operation. The third operation compares the resulting pixel data with the lower range boundary of −32767. If the resulting pixel data exceeds the lower range boundary, then the lower range boundary value is transferred into the resulting pixel data. Otherwise, another conditional branch occurs which bypasses the execution of the third operation, i.e., the resulting pixel data falls within the range boundaries.

The use of conditional branches in a superscalar pipelined processor decreases processor execution throughput because the branches interrupt the pipeline processing of instructions. Also, conditional branches usually require processors to perform a memory fetch from intermediate or main memory in the event of a cache miss. Since intermediate or main memory is typically much slower than an instruction register which is used to process the instructions, the time to process the conditional branches takes much longer to complete than instructions that do not require fetches from intermediate or main memory. Thus, not only does the processor incur an increase in fetch latency but it also takes an efficiency hit due to the fact that the pipelining of instructions has been interrupted by the branches.

Accordingly, it would be desirable to provide an apparatus that ensures resulting pixel data remain within the range boundaries of a signed 16-bit integer without the use of conditional branches in an instruction. This advantage is achieved by performing two shift operations, two logic multiplications, one addition, one load, and one logic addition to obtain a result that is within the range boundaries of a signed 16-bit integer, improving the instruction throughput of a processor.

SUMMARY OF THE INVENTION

The present invention is directed to checking and reducing an intermediate signal arising from a manipulation of 16-bit signed data signals without using conditional branches, thereby improving instruction processing in a superscalar pipelined processor or an arithmetic unit that can execute several arithmetic operations concurrently. In the preferred embodiment of the present invention, the data signals are represented as signed 16-bit binary values in a two's compliment format. An intermediate register that is greater than 16-bits wide is used, allowing for the proper checking of an overflow condition. It is presently contemplated that the present invention include using a processor operating under program control. The program determines whether the intermediate signal is in a positive overflow state or a negative overflow state. The program sets a first mask signal to have 16 lower bits in an ON position when the intermediate signal is within the range boundary of a 16-bit signed integer. If the intermediate signal exceeds the maximum range boundary of 32767, then the first mask signal is set to have its 31st through 17th bits in the ON position, while the remaining bit positions are placed in the OFF position. If the intermediate signal exceeds the minimum range boundary of −32767, then the first mask signal is set to have its 32 bit position set to the ON position, while the remaining bit positions are placed in the OFF position. The second mask signal has a value that is equal to the first mask value bit-shifted 16 bit positions to the right. Finally, the program bitwise ANDs the original intermediate result with the first mask signal to obtain a translated data signal, and bitwise ORs the translated data signal with the second mask signal.

DESCRIPTION OF THE PREFERRED EMBODIMENTS

In the following description, a preferred embodiment of the invention is described with regard to preferred process steps and data structures. Those skilled in the art would recognize after perusal of this application that embodiments of the invention can be implemented using one or more general purpose processors operating under program control, or special purpose processors adapted to particular process steps and data structures, and that implementation of the process steps and data structures described herein would not require undue experimentation or further invention.

The present invention is directed to checking and reducing a 16-bit intermediate signal arising from a manipulation of data signals without using conditional branches, thereby improving instruction processing in a superscalar pipelined processor or an arithmetic unit that can execute several arithmetic operations concurrently.

The data signals are represented as 16-bit signed integers which requires the intermediate signal to be stored in a register that is greater than 16-bits wide. This allows for the proper checking of an overflow condition. In the preferred embodiment, the focus of whether an overflow condition exists focuses on the state of the 16th and 17th bits of the intermediate result data. Consequently, intermediate registers need to have a 15th and 16th bit position but may be conventionally sized as 32-bit wide registers to fit within the processing scheme of a processor.

Data manipulations of 16-bit signed integers that require overflow checking arise from many different types of signal processing applications. Images may be superimposed, requiring pixel signals from the image sources to be processed so that when displayed, one image is semi-transparent over the other image. If the images are comprised of pixels represented as 16-bit signed integers, this results in combining pixels that occupy the same pixel space to a single intermediate signal. To ensure that the intermediate signal is within the 16-bit signed integer data scheme, its overflow condition must be checked. And if in the overflow condition, reduced to within the range boundaries of a signed 16-bit integer. The range boundaries of a signed 16-bit integer in a two's compliment format include a maximum positive range boundary of 32767 and a maximum negative range boundary of −32767.

Figure 1:
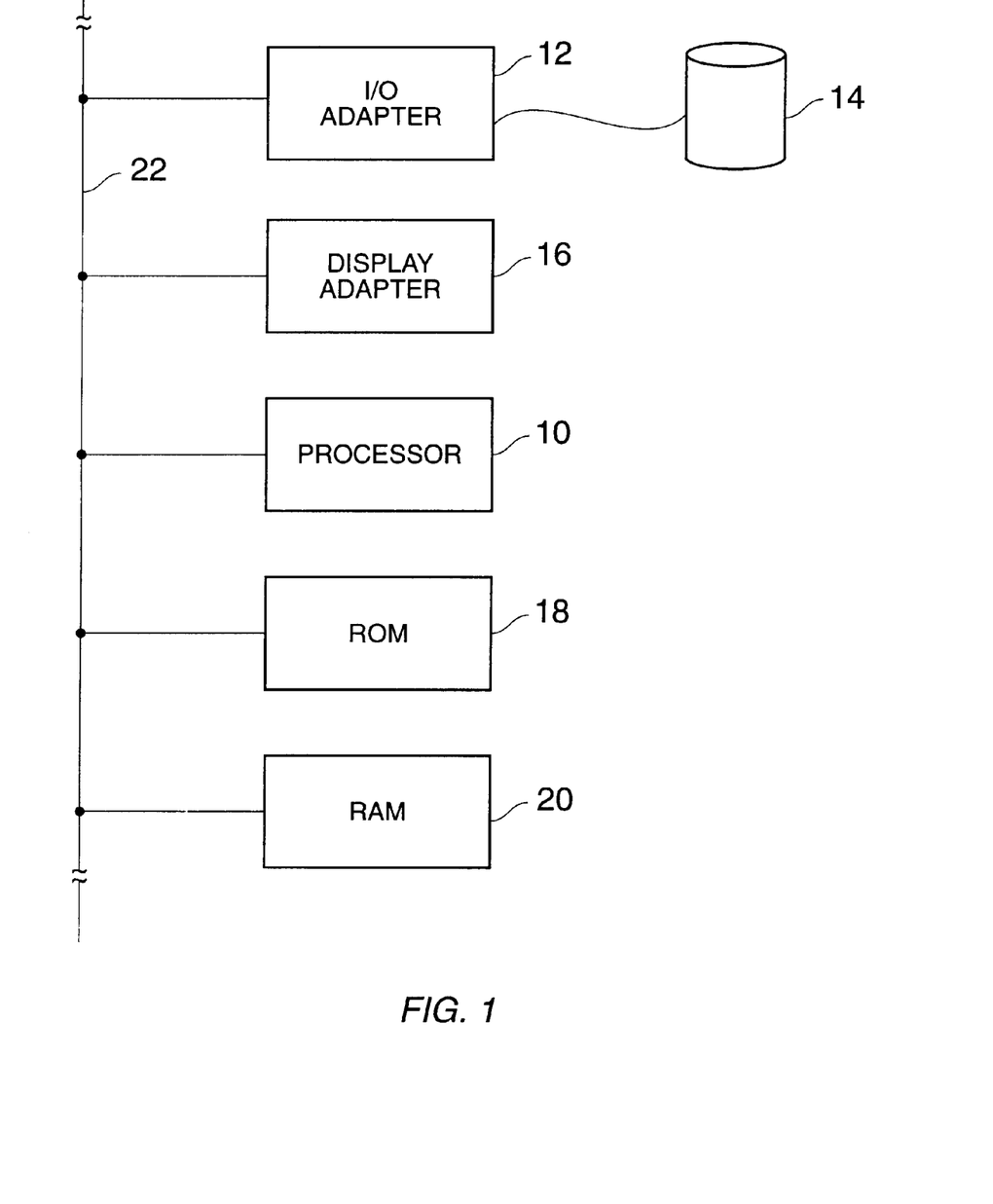
FIG. 1 is a schematic block diagram illustrating a computer system.

FIG. 1 is a schematic block diagram illustrating a computer system 8 in which the presently preferred invention would have application. Computer system includes a superscalar pipelined processor 10, an I/O adapter 12 coupled to a data store 14, a display adapter 16, a ROM 18, and RAM devices 20. A data and addressing bus 22 is also shown coupled to each of the items included with the computer system.

Figure 2:
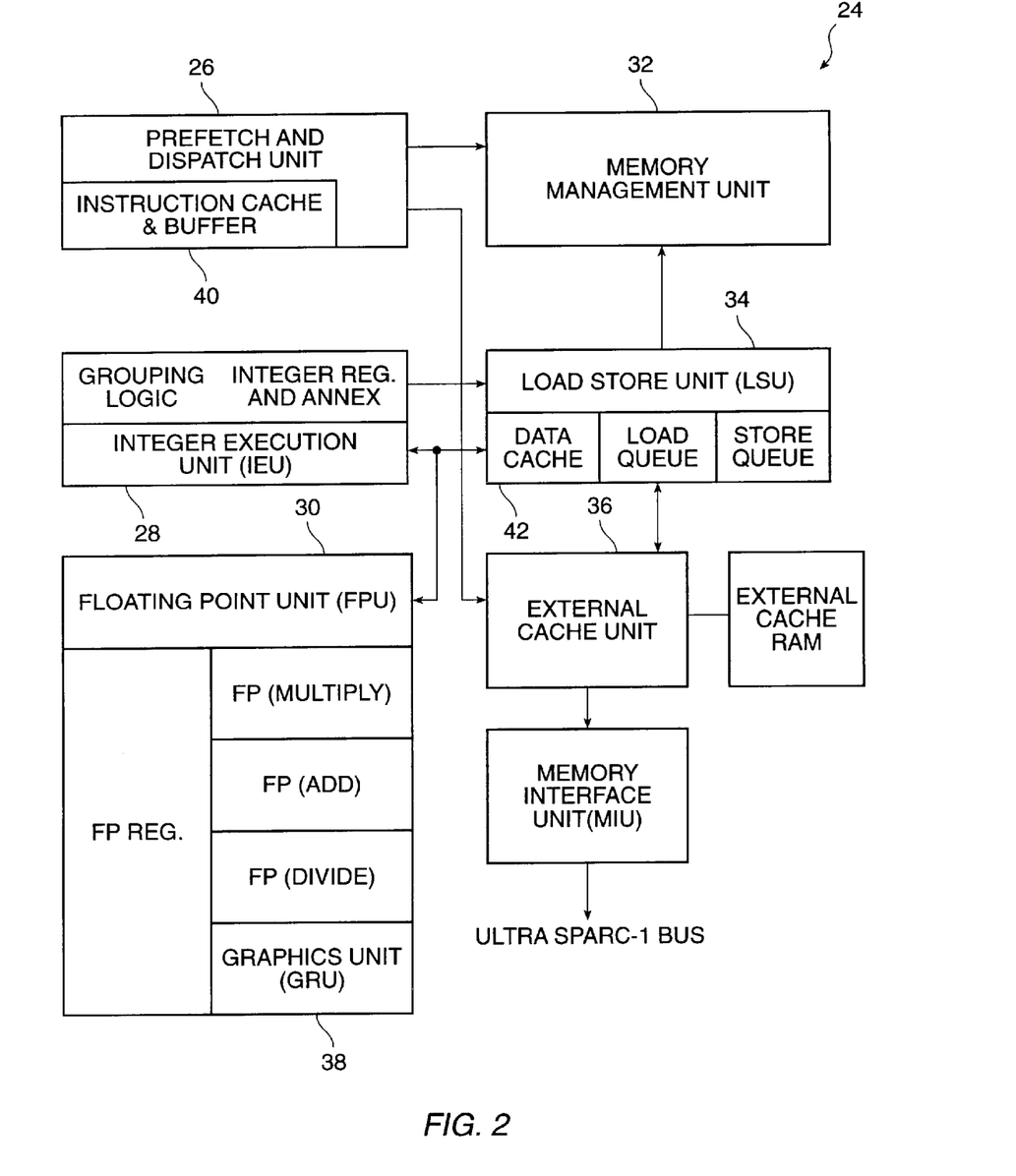
FIG. 2 is a schematic block diagram illustrating a processor used in accordance with a preferred embodiment of the present invention.

FIG. 2 is a schematic block diagram illustrating an example superscalar pipelined processor 24 used in accordance with a preferred embodiment of the present invention. A Prefetch and Dispatch Unit (PDU) 26, an Integer Execution Unit (IEU) 28, a Floating-Point Unit (FPU) 30, a Memory Management Unit (MMU) 32, a Load and Store Unit (LSU) 34, an External Cache Unit (ECU) 36, a Graphics Unit (GRU) 38, an Instruction Cache 40, and a Data Cache 42 are shown in FIG. 2. Superscalar pipelined processors are known in the art of computer architecture. Consequently, those of ordinary skill in the art will readily recognize that processor 24 is capable performing arithmetic and logical operations that include bitwise shifting, bitwise AND operations, bitwise OR operations, and addition operations when operating under program control.

The PDU 26 ensures that all execution units remain busy by fetching instructions before they are needed in the pipeline. Instructions can be prefetched from all levels of the memory hierarchy, including instruction cache 40, external cache 36, and main memory. The PDU 26 provides a 12-entry prefetch buffer which minimizes pipeline stalls. In addition, the PDU 26 has a 9-stage instruction pipeline to minimize latency and dynamic branch prediction to allow for greater prediction accuracy.

The pipeline is a double-instruction-issue pipeline with nine stages: fetch, decode, grouping, execution, cache access, load miss, integer pipe wait, trap resolution, and writeback. These stages imply that the latency (time from start to end of execution) of most instructions is nine clock cycles. However, at any given time, as many as nine instructions can execute simultaneously, producing an overall rate of execution of one clock per instruction in many cases. However, some instructions may require more than one cycle to execute due to the nature of the instruction such as a branch instruction or to a cache miss, or other resource contention.

The first stage of the pipeline is a fetch from instruction cache 40. In the second stage, instructions are decoded and placed in the instruction buffer. The third stage, grouping, groups and dispatches up to four instructions. Next, integer instructions are executed and virtual addresses calculated during the execution stage. In the fifth stage data cache 42 is accessed. Cache hits and misses are determined, and branches are resolved. If a cache miss was detected, the loaded miss enters the load buffer. At this point, the integer pipe waits for the floating-point/graphics pipe to fill and traps are resolved. In the final stage, writeback, all results are written to the register files and instructions are committed.

IEU 28 includes two ALU (arithmetic logical units) for arithmetic, logical, and shift operations, an eight window register file, result bypassing, and a Completion Unit which allows a nine-stage pipeline with minimal bypasses.

FPU 30 is a pipelined floating-point processor that consists of five separate functional units to support floating-point and multimedia operations. The separation of execution units allows the issuance and execution of two floating-point instructions per cycle. Source and data results are stored in a 32-entry register file in either 8, 16 or 32 bit lengths. Most floating-point instructions have a throughput of one cycle, a latency of three cycles, and are fully pipelined. The FPU is able to operate on both single precision (32-bit), and double-precision (64-bit) numbers, normalized or denormalized, in hardware, and quad-precision (128-bit) operands in software.

FPU 30 is tightly coupled to the integer pipeline and is capable of seamlessly executing a floating-point memory event and a floating-point operation. IEU 28 and FPU 30 have a dedicated control interface which includes the dispatch of operations fetched by the PDU 26 to the FPU30. Once in the queue, the PDU 26 is responsible for distribution of instructions to the FPU 30. IEU 28 controls the data cache portion of the operation, while the FPU 30 decides how to manipulate the data. The IEU 28 and FPU 30 cooperatively detect floating-point data dependencies. The interface also includes IEU 28 and FPU 30 handshaking for floating-point exceptions. The FPU 30 performs all floating-point operations and implements a 3-entry floating-point instruction queue to reduce the impact of bottlenecks at the IEU 28 and improve overall performance.

MMU 32 handles all memory operations as well as arbitration between data stores and memory.

GRU 38 relies on integer registers of varying bit lengths for addressing image data, and floating point registers for manipulating that data. This division of labor enables processor to make full use of all available internal registers so as to maximize graphical throughput.

Method of Operation

Figure 3:
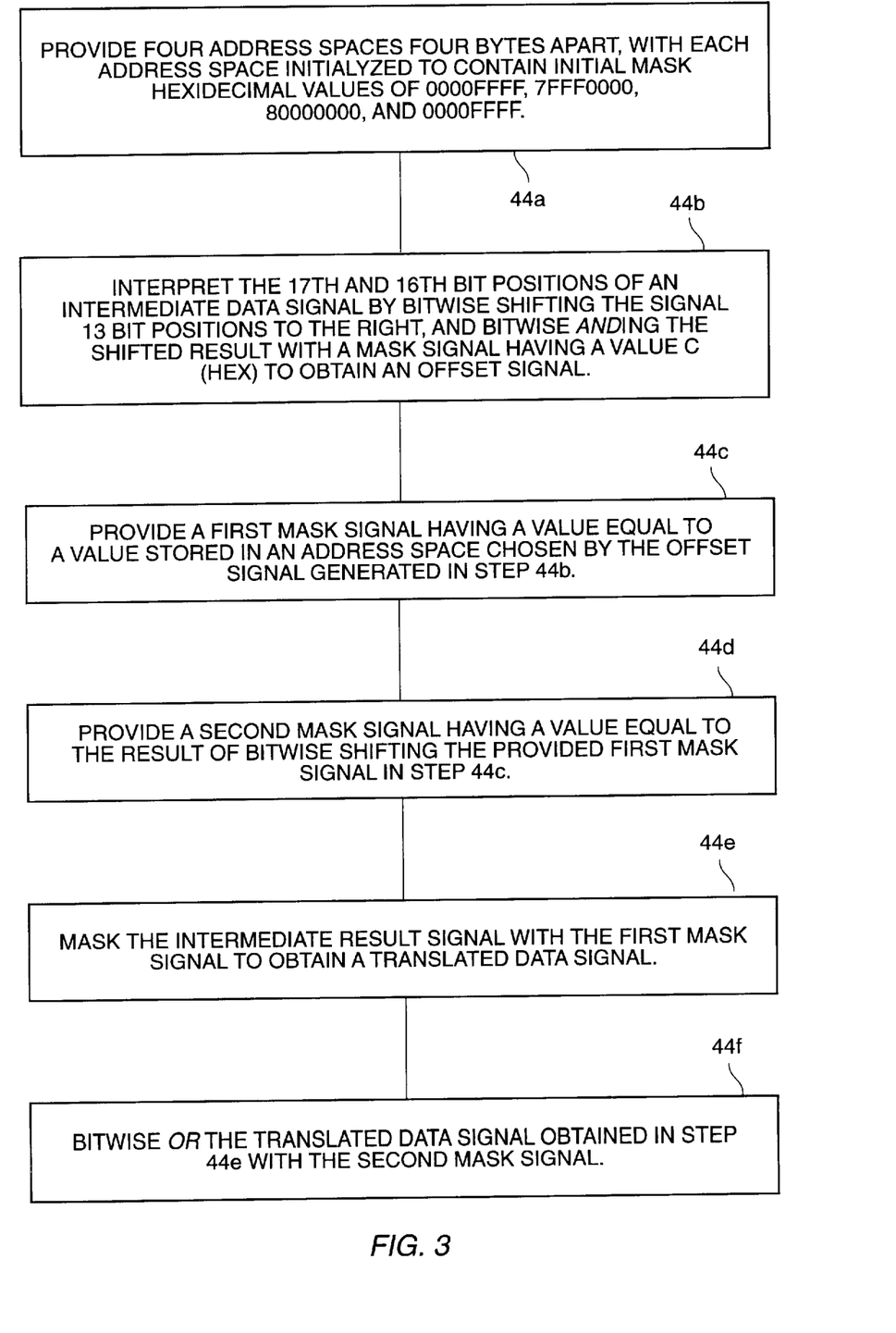
FIG. 3 is a process flow diagram showing the method of operation in accordance with a preferred embodiment of the present invention.

FIG. 3 is a process flow diagram showing a method of operation in accordance with a preferred embodiment of the present invention.

Figure 4:
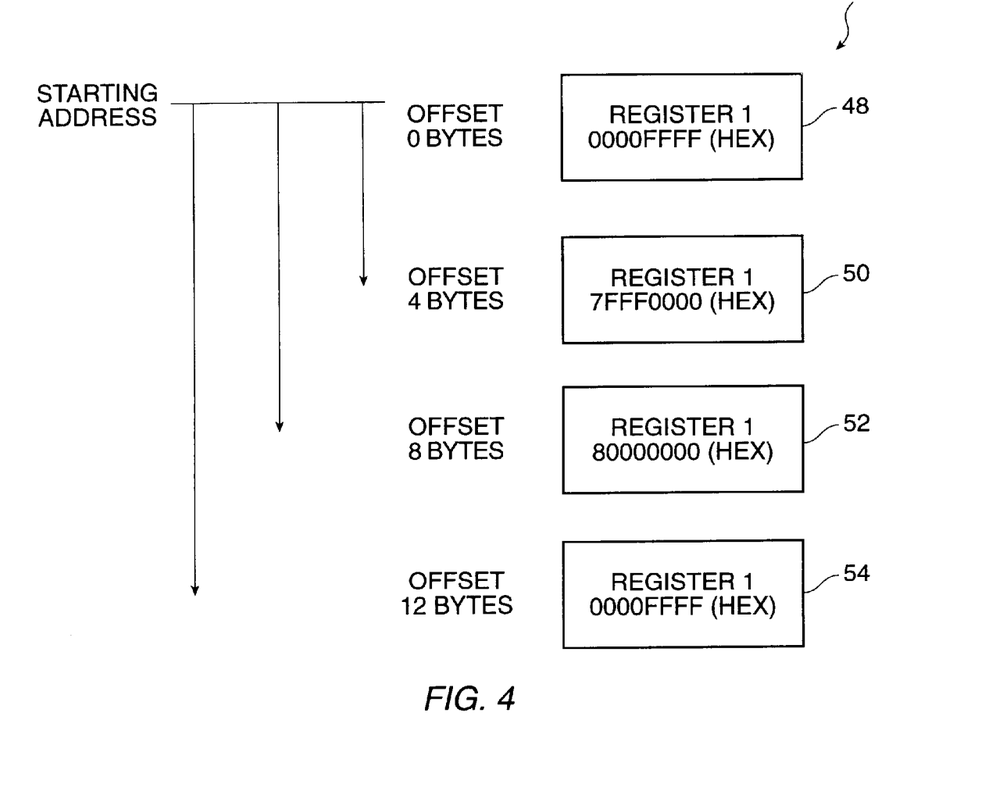
FIG. 4 is a block diagram of registers sequentially addressed in an 8-bits per byte address space.

FIG. 4 is a block diagram of registers sequentially addressed in an 8-bits per byte address space in accordance with a preferred embodiment of the present invention.

Figure 5:
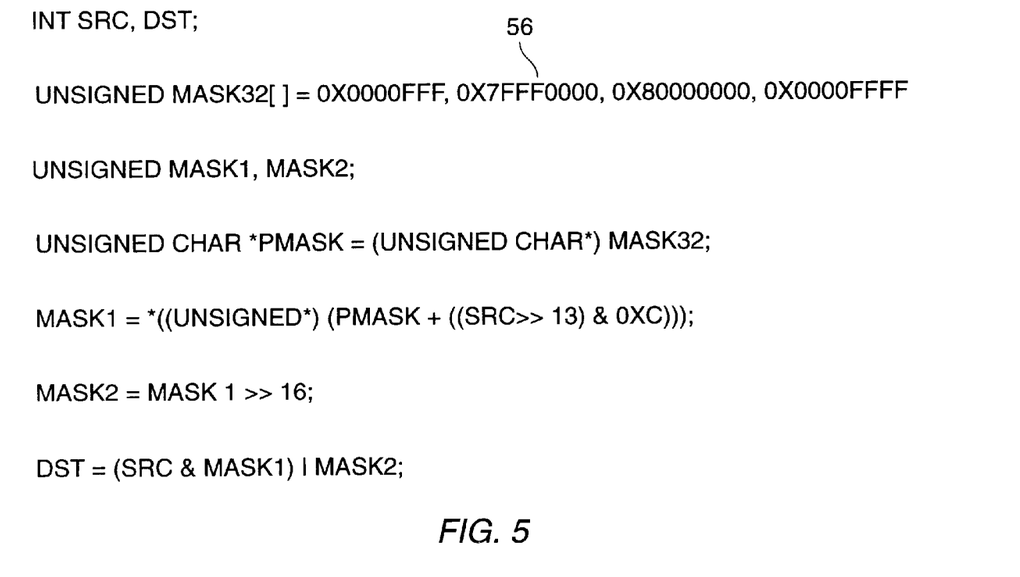
FIG. 5 is an implementation in a processor operating under program control using the "C" programming language in accordance to a preferred embodiment of the present invention.

FIG. 5 is an implementation in a processor operating under program control using the "C" programming language in accordance with a preferred embodiment of the present invention.

Referring now to FIG. 3, at step 44a registers are initialized to their initial values. In the preferred embodiment, the registers may be in an array form having elements for storing mask signals represented as 32-bit binary values. As seen in FIG. 4, the registers 46 are sequentially addressed so that they are four (4) bytes apart from each other in an 8-bits per byte address space. The first 48, second 50, third 52, and fourth 54 registers are initialized to hold a signal represented as 0000FFFF (hex), 7FFF0000 (hex), 80000000 (hex), and 0000FFFF (hex), respectively.

Alternatively, as seen in FIG. 5, the registers may be implemented in the "C" programming language as an array of unsigned integers 56. This array may be formed in system memory or any memory available to a processor operating under program control.

Referring back to FIG. 3, at step 44b, a processor determines whether an intermediate signal is in a positive overflow state or negative overflow state Specifically, the processor is directed under program control to bitwise shift the intermediate signal thirteen bit positions to the right which is then bitwise ANDed ("masked") with a mask signal having a value C (hex) to obtain an offset signal.

Alternatively, the intermediate signal may be bit-shifted 15 positions to the right and masked with a mask signal having a value 3 (hex) to obtain an offset signal. This alternative approach is applicable in processors having compilers that transforms a two bit index into a byte address but incurs an added step of bitwise shifting the offset signal two places to the left to obtain a proper byte address.

Step 44b results in interpreting the 17th and 16th bit positions of the original intermediate signal in the following manner. An overflow status of "00" or "11" in the 17th and 16th bit positions of the intermediate signal results in an offset signal having the value of "0" or "12", respectively, indicating that the intermediate signal is within the boundary range of a 16-bit signed integer.

An overflow status of "01" in the 17th and 16th bit positions results in an offset signal having the value of "4", indicating that the intermediate signal exceeds the maximum boundary of a 16-bit signed integer.

An overflow status of "10" in the 17th and 16th bit positions results in an offset signal having the value of "8", indicating that the intermediate signal exceeds the minimum boundary of a 16-bit signed integer.

At step 44c, a first mask signal receives a mask value stored in one of the registers. A register is chosen according to the value assigned to the offset signal in step 46. For example, if an offset signal having a value of "0", "4", "8", or "12" chooses the first, second, third, or fourth register, respectively.

The value C (hex) used as a mask signal in step 44b may be appropriately filled with additional binary signals of the value zero, depending on the size of the intermediate register used. This provides a level of scalability as to the size of the intermediate register.

As known in the art, a bitwise AND operation passes through all bits that are ON in bit positions that correspond to bit positions in first mask signal having an ON bit. All other bit positions, whether ON or OFF, that correspond to bit positions in the first mask signal having an OFF bit are set to the OFF position.

At step 44d, a second mask signal receives the operational result of bitwise shifting the first mask signal 16 bit positions to the right.

At step 44e, the processor masks the intermediate signal with first mask signal to obtain a translated data signal. Specifically, this mask operation includes bitwise ANDing the intermediate signal with the first mask signal.

At step 44f, the processor performs a bitwise OR operation on translated data signal using second mask signal. As known in the art, a bitwise OR operation turns all bits that are OFF to ON in bit positions that correspond to bit positions in second mask signal having an ON bit. All other bit positions, whether ON or OFF, that correspond to bit positions in the second mask signal having an OFF bit are passed through without change.

The above method of operation essentially is based on the analysis of the 17th and 16th bits of the intermediate signal which are interpreted in the following way. An overflow status of "00" or "11" indicates that the original intermediate signal is inside the range of a signed 16-bit integer in a two's compliment format, which is a range between 32767 and −32767. Thus, the first mask signal is set to have 16 lower bits in an ON position when the intermediate signal is within the range boundary of a 16-bit signed integer, i.e., the first mask signal may have a mask value of 0000FFFF (hex).

An overflow status of "01" indicates a positive overflow state with the intermediate signal exceeding the maximum range boundary of 32767 for a 16-bit signed integer in a two's compliment format. If so, the first mask signal is set to have its 31st through 17th bits in the ON position. Thus, the first mask signal may have a mask value of 7FFF0000 (hex).

An overflow status of "10" indicates a negative overflow state with the intermediate signal exceeding the minimum range boundary of −32767 for a 16-bit signed integer in a two's compliment format. The first mask signal is set to have its 32nd bit position set to an ON state, while the remaining bit positions are set to have an OFF state. Thus, an overflow status of "10" results in the first mask signal receiving a mask value of 80000000 (hex), The second mask signal has a value that is equal to the first mask value bit-shifted 16 bit positions to the right. All bit positions that are left vacant by the bitwise shift operation are filled with zero.

The first mask signal is bitwise ADDed with the original intermediate signal with the resulting value bitwise ORed with the second mask signal. This operation either reduces or passes through the original intermediate signal depending on its value.

Alternative Embodiments

Alternative embodiments of the present invention may include embedding the steps of the method of the present invention into a Field Programmable Gate Architecture (FPGA) as is well-known in the art, or using an integrated circuit design program such as VHDL to describe the method, thus hard coding the method in an application-specific integrated circuit (ASIC). The skill necessary to perform such embedding and hard coding is well-known to those of ordinary skill in the art.

While preferred embodiments are disclosed herein, many variations are possible which remain within the concept and scope of the invention, and these variations would become clear to one of ordinary skill in the art after perusal of the specification, drawings and claims herein.

What is claimed is:

1. An apparatus for optimizing the overflow checking and reduction of signed data signals, the apparatus comprising:
   a first register, a second register, a third register, and a fourth register holding mask values of 0000FFFF (hex), 7FFF0000 (hex), 80000000 (hex), and 0000FFFF (hex), respectively, said registers sequentially addressed so that they are four bytes apart from each other in an 8-bits per byte address space;
   a processor coupled to said registers, said processor processing 16-bit signed data signals to obtain an intermediate signal having a 17th and 16th bit position;
   shifting said intermediate signal thirteen bit positions to the right and masking said shifted signal with a signal having a value C (hex) to obtain an offset signal;
   providing a mask value to a first mask signal from one of said first, second, third, or fourth registers in response to said offset signal;
   setting a second mask signal to have a value equal to said first mask signal that is shifted 16 bit positions to the right;
   bitwise ANDing said intermediate signal with said first mask signal to obtain a translated data signal; and
   bitwise ORing said translated data signal with said second mask signal.

2. The apparatus of claim 1, wherein said processor is responsive to said overflow status by setting said first mask signal equal to said mask value from said first register, said second register, said third register, or said fourth register when said overflow status is equal to "00", "01", "10" or "11", respectively.

3. The apparatus of claim 1, further comprising:
   a data store bus coupled to said processor; and
   a data store coupled to said data store bus, said data store responsive to read and write commands from said processor.

4. An apparatus for increasing the processing throughput of a processor, the apparatus comprising:
   a processor responsive to a data signal having a 17th and 16th bit position, said 17th and 16th bit positions indicating a within range status when said 17th and 16th bit positions both have an ON state or an OFF state, said 17th and 16th bit positions indicating a positive overflow status when said 17th and 16th bit positions have an OFF and ON state, respectively, and said 17th and 16th bit positions indicating a negative overflow status when said 17th and 16th bit positions have an ON and OFF state, respectively;
   said processor setting a first mask signal to have a mask value having 16 lower bits in an ON position in response to said within range status;
   said processor setting said first mask signal to have a mask value having bit positions 31 through 17 in the ON position and bit positions 32 and 16 through 1 set to an OFF position in response to said positive overflow status; said processor setting said first mask signal to have a mask value having bit position 32 in the ON position and bit positions 31 through I set to an OFF position in response to said negative overflow status;
   said processor setting a second mask signal to have a value equal to said first mask signal shifted 16 bit positions to the right;
   said processor masking said data signal by said first mask signal to obtain a masked result; and
   said processor turning all bits ON in said masked result that are in bit positions that correspond to bit positions in said second mask signal that are ON to obtain a reduced signed 16-bit data signal.

5. An apparatus for increasing the processing throughput of a processor, the apparatus comprising:
   a processor responsive to an intermediate signal having a 17th and 16th bit position, said processor providing an overflow status from said 17th and 16th bit positions;
   said processor providing a mask value to a first mask signal in response to said overflow status;
   said processor setting a second mask signal to have a value equal to said first mask signal that is shifted 16 bit positions to the right; said processor masking said intermediate signal by said first mask signal to obtain a masked result; and
   said processor turning all bits ON in said masked result that are in bit positions that correspond to bit positions in said second mask signal that are ON to obtain a reduced signed 16-bit data signal.

6. The apparatus of claim 5, wherein said processor initializes a first register, a second register, a third register, and a fourth register to hold mask values of 0000FFFF (hex), 7FFF0000 (hex), 80000000 (hex), and 0000FFFF (hex), respectively, said registers sequentially addressed so that they are four bytes apart from each other in an 8-bits per byte address space;
   said processor shifts said intermediate signal thirteen bit positions to the right and masking said shifted signal with a signal having a value C (hex) to obtain an offset signal; and wherein said processor uses said offset signal to determine which of said first, second, third, or fourth registers to provide said mask values to said first mask signal.

7. The apparatus of claim 5, wherein said processor initializes a first register, a second register, a third register, and a fourth register to hold mask values of 0000FFFF (hex), 7FFF0000 (hex), 80000000 (hex), and 0000FFFF (hex), respectively, said registers sequentially addressed so that they are four bytes apart from each other in an 8-bits per byte address space;

said processor shifts said intermediate signal fifteen bit positions to the right and masking said shifted signal with a signal having a value 3 (hex) to obtain an offset signal;

said processor shifts said offset signal two positions to the left to obtain a shifted offset signal; and said processor uses said shifted offset signal to determine which of said first, second, third, and fourth registers to provide said mask value to said first mask signal.

8. A computer program for increasing the processing throughput of a processor, the program recorded in a computer-readable medium for causing a computer to perform the steps of:

processing data signals to obtain an intermediate signal having a 17th and 16th bit position, said 17th and 16th bit positions providing an overflow status;

initializing a first register, a second register, a third register, and a fourth register to hold mask values of 0000FFFF (hex), 7FFF0000 (hex), 80000000 (hex), and 0000FFFF (hex), respectively, said registers sequentially addressed so that they are four bytes apart from each other in an 8-bits per byte address space;

shifting said intermediate signal thirteen bit positions to the right and masking said shifted signal with a signal having a value C (hex) to obtain an offset signal;

using said offset signal to determine which of said first, second, third, and fourth registers to provide said mask values to said first mask signal;

setting a second mask signal to have a value equal to said first mask signal bitshifted 16 times to the right;

masking said intermediate signal with said first mask signal to obtain a masked result signal; and turning all bits ON in said masked result signal that are in bit positions that correspond to bit positions in said second mask signal that are ON to obtain a reduced data signal.

9. A computer program product for optimizing the processing of 16-bit signed data signals, the computer program product comprising:

a computer usable medium having computer readable program code embodied in said medium for optimizing the processing of 16-bit signed signals in a computer system, said computer program product having:

computer readable program code for storing first, second, third, and fourth mask values of 0000FFFF (hex), 7FFF0000 (hex), 80000000 (hex), and 0000FFFF (hex), respectively, in said mask values sequentially addressed so that they are four bytes apart from each other in an 8-bits per byte address space;

computer readable program code for processing a 16-bit signed data signal to obtain an intermediate signal having a 17th and 16th bit position, said 17th and 16th bit positions providing an overflow status;

computer readable program code for shifting said intermediate signal thirteen bit positions to the right and masking said shifted signal with a signal having a value C (hex) to obtain an offset signal;

computer readable program code for using said offset signal to determine which of said first, second, third, and fourth mask values to said first mask signal;

computer readable program code for setting a second mask signal to have a value equal to said first mask signal bitshifted 16 bit positions to the right;

computer readable program code for masking said intermediate signal by said first mask signal to obtain a masked result signal; and computer readable program code for reducing said 16-bit signed data signal by bitwise ORing said masked result signal with said second mask signal.

10. The product of claim 9, wherein said computer readable program code is responsive to said overflow status by setting said first mask signal to said first, second, third, or fourth mask value when said overflow status is equal to "00", "01", "10", or "11" respectively.

11. An article of manufacture, comprising:

a computer usable medium having a computer readable program code means embodied therein for increasing the processing throughput of a processor, the computer readable program code means in the article of manufacture comprising:

computer readable program code means for storing a first register, a second register, a third register, and a fourth register mask values of 0000FFFF (hex), 7FFF0000 (hex), 80000000 (hex), and 0000FFFF (hex), respectively, said registers sequentially addressed so that they are four bytes apart from each other in an 8-bits per byte address space;

computer readable program code means for obtaining an overflow status of a 16-bit signed data signal having a 17th and 16th bit position, said 17th and 16th bit positions providing an overflow status;

computer readable program code means for shifting said intermediate signal thirteen bit positions to the right;

computer readable program code means for setting a second mask signal to have a value equal to said first mask signal bitshifted 16 bit positions to the right;

computer readable program code means for masking said intermediate signal by said first mask signal to obtain a masked result signal; and computer readable program code means for obtaining a reduced 16-bit signed data signal by bitwise ORing said masked result signal with said second mask signal.

12. The article of manufacture of claim 11, wherein said computer readable program code means for obtaining is responsive to said overflow status by setting said first mask signal to said first, second, third, or fourth mask value when said overflow status is equal to "00", "01", "10", or "11", respectively.

* * * * *

UNITED STATES PATENT AND TRADEMARK OFFICE
CERTIFICATE OF CORRECTION

PATENT NO. : 5,917,740
DATED : June 29, 1999
INVENTOR(S) : Vladimir Y. Volkonsky It is certified that error appears in the above-identified patent and that said Letters Patent is hereby corrected as shown below:

In column 1, line 18, please replace "a method and apparatus" with --an apparatus--.

In column 5, line 67, after the second recitation of "state" and prior to "Specifically" insert --.--.

In column 6, line 28, please replace "46" with --44b--.

In the Abstract, on the 6th line from the bottom, after the second recitation of "position" and prior to "The" insert --.--.

Signed and Sealed this

First Day of February, 2000

Attest:

Q. TODD DICKINSON

*Attesting Officer*     *Acting Commissioner of Patents and Trademarks*